United States Patent
Tamaki et al.

(10) Patent No.: US 6,882,469 B2
(45) Date of Patent: Apr. 19, 2005

(54) REGENERATIVE OPTICAL AMPLIFIER (75) Inventors: Yusuke Tamaki, Minato-ku (JP);
Kazuya Takasago, Minato-ku (JP);
Taisuke Miura, Kawasaki (JP); Hitoshi Sekita, Minato-ku (JP)

(73) Assignee: Cyber Laser Inc., Tokyo (JP)

( * ) Notice: Subject to any disclaimer, the term of this patent is extended or adjusted under 35 U.S.C. 154(b) by 0 days.

(21) Appl. No.: 10/619,310

(22) Filed: Jul. 14, 2003

(65) Prior Publication Data

US 2004/0075892 A1 Apr. 22, 2004

(30) Foreign Application Priority Data

Jul. 15, 2002 (JP) ........................................ 2002-206315

(51) Int. Cl.[7] .............................................. H01S 3/00
(52) U.S. Cl. ...................................................... 359/348
(58) Field of Search ...................... 372/92, 94; 359/338, 359/348

(56) References Cited

U.S. PATENT DOCUMENTS 4,896,119 A * 1/1990 Williamson et al. ........ 359/348
5,285,310 A * 2/1994 Miller et al. ................. 359/338

* cited by examiner

Primary Examiner—Mark Hellner
(74) Attorney, Agent, or Firm—Pearne & Gordon LLP (57) ABSTRACT

The invention offers a regenerative optical amplifier enabling voltage to be easily applied to polarizing elements such as Pockels cells, without the need for complicated drive circuitry. An input beam of S-polarized light is reflected by a polarizer 1 and advances to a Pockels cell 2. In the time it takes for the input beam, having once passed through the Pockels cell 2, to be reflected by a reflective mirror 3 and return to the Pockels cell 2, a voltage $V_{P1}$ causing a 90-degree rotation in the polarization of transmitted light is applied to the Pockels cell 2, and this applied voltage $V_{P1}$ is maintained. The input beam is converted by the Pockels cell 2 into a P-polarized light pulse which is transmitted by the polarizer. Subsequently, the light pulse is converted from P-polarized light to S-polarized light and back to P-polarized light with each roundtrip of the Pockels cell 2, while passing each time between the reflective mirror 3, laser crystal 4 and reflective mirror 7, so as to be amplified in the resonator formed thereby. The amplified light pulse is extracted by applying a voltage $V_{P2}$ causing a 90-degree rotation of the polarization of the transmitted light to the Pockels cell 6 to convert the light pulse to S-polarized light which is then reflected out of the resonator by the polarizer 5.

5 Claims, 6 Drawing Sheets

REGENERATIVE OPTICAL AMPLIFIER

BACKGROUND Of THE INVENTION

The present invention relates to a regenerative optical amplifier having a resonator for amplifying light, and using a polarizing element driven by the application of voltage.

Regenerative amplifiers are amplifying devices that trap pulses of light supplied from a laser light source in a resonator for amplification, and extract the amplified light pulses from the resonator to obtain high-power light pulses. Polarizing elements such as Pockels cells driven by application of voltage are often used in order to trap and extract the light pulses. Pockels cells are polarizing elements that are driven by the application of voltage to crystals exhibiting the Pockels effect, in which the optical properties of the crystal can be made to become anisotropic with the application of voltage, thereby changing the state of polarization of the light passing through the crystal. In regenerative amplifiers making use of Pockels cells, the use of polarizers and the like in combination with Pockels cells allows for optical switching whereby light pulses are trapped in the resonator where the light is amplified, and then extracted.

Figure 5:
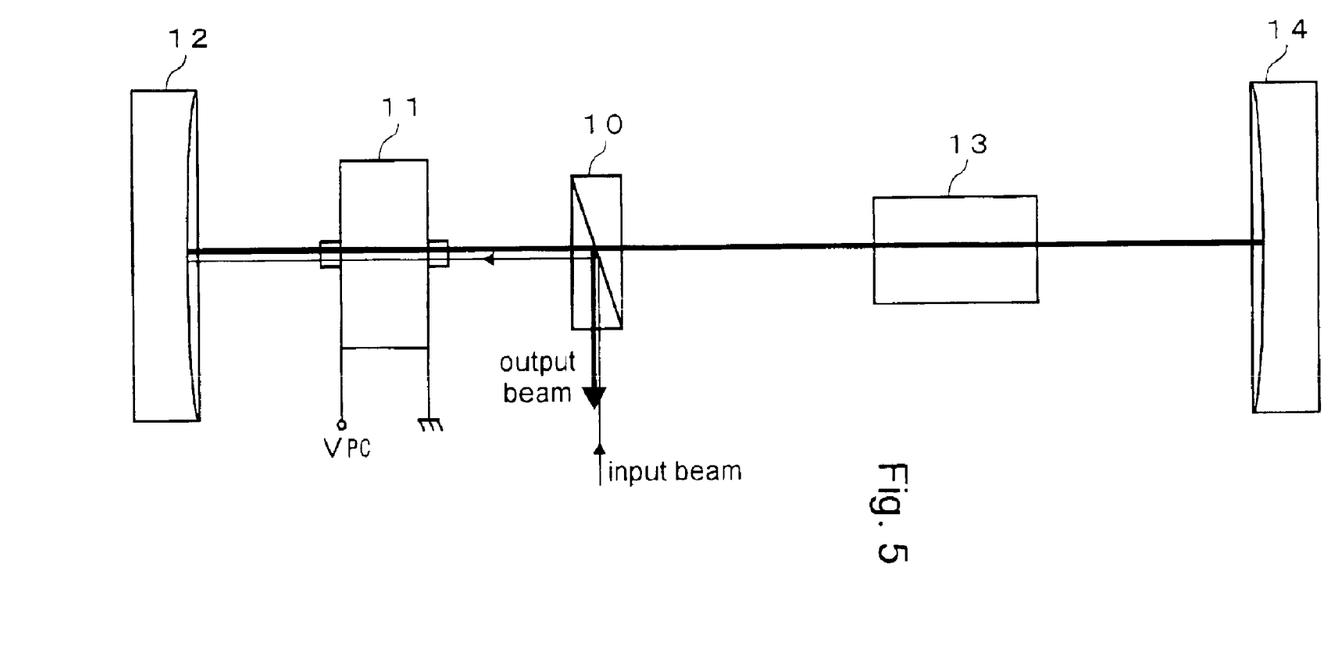
FIG. 5 is a schematic diagram showing the structure of a conventional regenerative optical amplifier.

FIG. 5 is a drawing showing an example of the structure of a conventional regenerative optical amplifier. The illustrated regenerative optical amplifier consists of a polarizer 10, a Pockels cell 11, a reflective mirror 12, a laser crystal (lasing medium) 13 and a reflective mirror 14. A laser light pulse from a laser light source is supplied as input light to the polarizer 10. The polarizer 10 reflects S-polarized light, i.e. light that is linearly polarized in the direction perpendicular to the plane of the drawing, and passes P-polarized light, i.e. light that is linearly polarized in the direction parallel to the plane of the drawing. When an S-polarized laser light pulse is supplied as the input light, the input light is reflected by the polarizer 10 and directed towards the Pockels cell 11. The Pockels cell 11 is a polarizing element that is driven by a voltage $V_{PC}$, such that when the voltage $V_{PC}$ is applied, the polarization of input light which has once passed through and been turned back by the reflective mirror 12 is rotated by 90 degrees. The input light which passes through the Pockels cell 11 while this voltage $V_{PC}$ is applied forms a P-polarized light pulse that passes through the polarizer 10, after which it continues through the resonator formed by the reflective mirror 12, laser crystal 13 and reflective mirror 14. As a result, the input light which has been transformed into a P-polarized light pulse is injected into the resonator as a seed light pulse to be amplified.

The light pulse trapped in the resonator is amplified in the process of repeatedly passing back and forth through the laser crystal 13 while oscillating in the resonator. The amplified light pulse can be converted into an S-polarized light pulse by applying a voltage $V_{PC}$ similar to the above at the moment it passes from the reflective mirror 12 into the Pockels cell 11. The amplified light pulse which has been S-polarized in this way is reflected at the polarizer 10, thus enabling a high-power amplified light pulse to be extracted as the output. The extracted output beam is separated from the input beam by light separating means, not shown, provided outside the resonator.

In regenerative optical amplifiers using Pockels cells as described above, the timing of the process for trapping and extracting light pulses is determined by the timing by which voltage is applied to the Pockels cells, thus offering the advantage of enabling the sequence of seed light pulses injected into the resonator and the amount of amplification of the injected seed light pulses to be readily controlled. Furthermore, regenerative optical amplifiers using Pockels cells are usually capable of providing amplified light pulses of generally good quality.

For these reasons, numerous types of regenerative optical amplifiers with different configurations of the Pockels cells and modes of application of voltage to the Pockels cells have been proposed. For example, with regard to configurations of the Pockels cells, regenerative optical amplifiers provided with two Pockels cells, one for entrapment and one for extraction of light pulses, have been proposed. In these regenerative optical amplifiers, voltage is applied to one of the Pockels cells only during entrapment of light pulses (during injection of seed light pulses), and voltage is applied to the other Pockels cell only during extraction of the amplified light pulses. Additionally, with regard to modes of application of voltage to Pockels cells, proposals have included those which apply a voltage that rotates the polarization of transmitted light by 45 degrees (to form a P-polarized or S-polarized beam), and those which apply a voltage to trap light pulses, such that the application of voltage is maintained during amplification, and the amplified light pulses are released when the voltage is returned to 0 V.

While Pockels cells change the polarization of transmitted light depending on the applied voltage as described above, they usually require application of a high voltage on the order of several kV in order to achieve the change in polarization required by regenerative optical amplifiers. For example, in a normal Pockels cell of KD*P crystal, about 7 kV must be applied in order to rotate the direction of polarization of laser light of wavelength 1064 nm by 90 degrees. Additionally, light pulses trapped in a resonator by applying voltage to a Pockels cell can make a roundtrip of a resonator and return to the original position at the Pockels cell in a few tens of ns (e.g. if the length of the resonator is 1.5–3 m, then a roundtrip of the resonator will take (roundtrip optical path length of resonator)/(speed of light)= (1.5–3 m)/(3×10$^8$ m/s)=10–20 ns). For this reason, the voltage applied to a Pockels cell must be an extremely short pulse which rises in a few ns and drops away again in a few ns. Thus, regenerative optical amplifiers using Pockels cells involve the problem of how to apply a high voltage on the order of kV to the Pockels cells in the short span of a few ns, complicating the drive circuitry (control circuits for the applied voltage) required for these Pockels cells.

Figure 6:
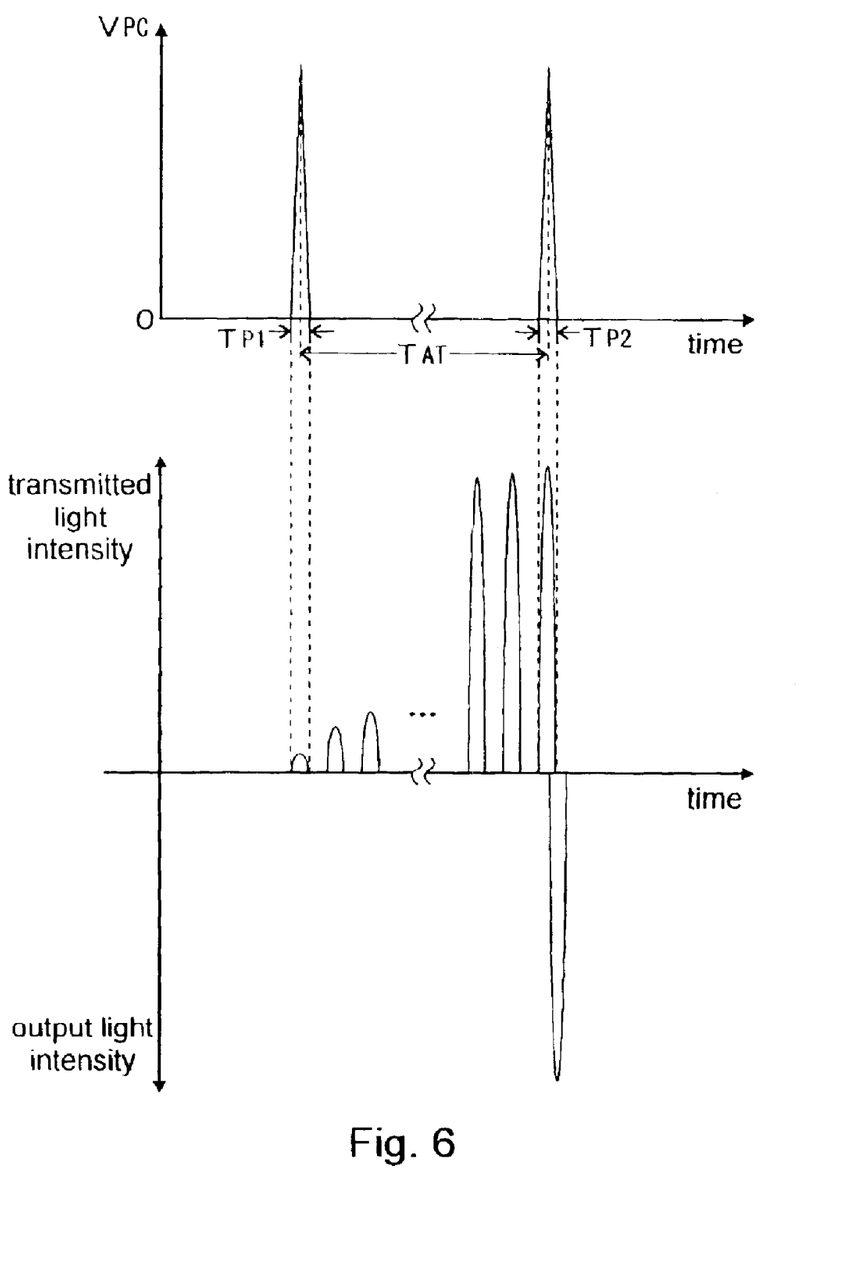
FIG. 6 is a timing chart showing the activity of the regenerative optical amplifier of FIG. 5 in terms of the voltage applied to the Pockels cell over time and the intensity of light pulses in the resonator.

For example, a voltage of $V_{PC}$ as shown in the timing chart of FIG. 6 must be applied to the regenerative optical amplifiers of the above-mentioned FIG. 5. In the timing chart of FIG. 6, the top portion shows the change in the applied voltage $V_{PC}$ over time, with the horizontal axis indicating the time and the vertical axis indicating the magnitude of the applied voltage $V_{PC}$. The bottom portion shows the change in intensity of the optical pulse in the resonator and the output beam over the passage of time, with the horizontal axis indicating the time just as in the top portion, the upper half of the vertical axis indicating the intensity of light transmitted by the Pockels cell 11 (of the light coming from the reflective mirror 12) and the lower half of the vertical axis indicating the intensity of the output beam. The voltage of the pulse at the time interval $T_{P_1}$ is the voltage $V_{PC}$ that is applied at the moment the input beam returns to the Pockels cell 11 as described above. This causes the injected seed light pulse to be amplified over the amplification time $T_{AT}$, so that the light pulse in the resonator will develop as shown in the upper half of the bottom portion. Then, the voltage $V_{PC}$ is applied as a pulse voltage during the time interval $T_{P2}$, which is the moment at which the amplified light pulse enters the Pockels cell 11 as described above, so that an S-polarized amplified light pulse appears as the output beam. Therefore, with regard to the regenerative optical amplifier of the FIG. 5, the two pulse voltages shown in the top portion of FIG. 6 must reach values on the order of kV, and the time intervals $T_{P1}$ and $T_{P2}$ must both be 10 ns or less.

Furthermore, the amplification time $T_{AT}$ for amplifying the injected seed light pulse is determined based on the time required for the pulse energy of the amplified light pulse to reach saturation when amplified by the laser crystal 13. A time of about 100–200 ns is usually selected. In contrast, the regenerative optical amplifier of FIG. 5 as described above requires two applications of a pulse voltage of kV order lasting just 10 ns or less. Moreover, it is very difficult to achieve symmetry in the rise and drop waveforms of the pulse voltages. Therefore, an amplification time $T_{AT}$ on the order of a few hundred ns must be selected although this is more than is actually required, thereby placing restrictions on the level of control allowed for the amplification time $T_{AT}$, and making it difficult to control the amplification time $T_{AT}$ with precision.

Recently, there has been a demand to obtain high-speed amplified light pulses of at least a few tens of kHz by repetitive high-speed light amplification with regenerative optical amplifiers. For this reason, not only do the drive circuits of Pockels cells require high-voltage power sources with quickly rising and falling output, but the high-voltage power sources also need to be capable of responding to high-speed repetitive operation on the order of a few tens of kHz, thus making it very difficult in actual practice to achieve a drive circuit for Pockels cells.

On the other hand, the above-described regenerative optical amplifiers having two Pockels cells only require each Pockels cell to be driven once in order to obtain an output beam, so that there is no need for repeated application of voltage to a single Pockels cell within the amplification time interval. However, this structure is no different from the regenerative optical amplifier at least in that a high voltage on the order of kV lasting only a few ns must be applied in order to drive the respective Pockels cells, thus making it difficult to achieve a drive circuit for the Pockels cells.

On the other hand, the types of regenerative optical amplifiers that maintain the voltage applied to the Pockels cell during light amplification require the applied voltage to rise quickly when trapping the light pulse and to drop quickly when extracting the amplified light pulse, thus requiring output properties similar to those described above in the high-voltage power sources to be used as drive circuits. In particular, complicated circuitry is needed to achieve a fast rise time, thus leaving unsolved the problem of how to make a suitable drive circuit for the Pockels cell. Additionally, once the applied voltage has quickly risen, the amplification time will last until the voltage quickly drops away, thus requiring restrictions on the control of the amplification time just as in the regenerative optical amplifier of FIG. 5, and making it difficult to increase the speed of the repetitive operation of the optical amplifier.

BRIEF SUMMARY OF THE INVENTION

The present invention has been achieved in consideration of the above situation, and has the object of offering a regenerative optical amplifier enabling voltage to be applied to polarizing elements such as Pockels cells and the like without requiring complicated drive circuits, allowing for flexible and precise control of amplification time, and capable of repetitive high-speed light amplification.

In order to accomplish the object, the regenerative optical amplifier according to the present invention comprises a resonator for amplifying injected light; a first polarizing portion for changing a direction of polarization of the input light, the direction of polarization of the input light being changed to a direction of polarization for injection to the resonator when the input light is supplied, continuing to drive the resonator with respect to the injected reciprocating light by application of voltage, and making the direction of polarization of light after completing a roundtrip the same as the direction of polarization of light prior to the roundtrip; and a second polarizing portion driven by application of voltage to change a direction of polarization of amplified light amplified by the resonator, being initially driven by application of voltage when extracting the amplified light from the resonator, and changing the direction of polarization of the amplified light to a direction of polarization for extraction from the resonator.

Here, the first polarizing portion may be driven by application of voltage, such as to be driven by application of voltage when supplied the input light, changing the direction of polarization of the input light to a direction of polarization for injection into the resonator, continuing to be driven with respect to reciprocating light injected into the resonator, and changing a direction of polarization of light after completing a roundtrip to the direction of polarization of the light before making the roundtrip. In this case, the first polarizing portion may be provided on the roundtrip path of light in the resonator, and driven by a voltage such as to rotate the polarization of transmitted light by 90 degrees, such that when the input light is supplied, voltage is applied to drive the first polarizing portion from the time the input light passes through the first polarizing portion on one of the roundtrip paths until the time it passes through the first polarizing portion on the other the roundtrip path.

Alternatively, the first polarizing portion may change the polarization of the input light to a polarization for injection to the resonator when no voltage is applied, and change the polarization of light which has completed a roundtrip to the polarization of the light prior to the roundtrip when voltage is applied, such that voltage is applied after the polarization of the input light is changed to the polarization for injection into the resonator, and voltage is continually applied with respect to light which has been injected into and is reciprocating in the resonator. In this case, the first polarizing portion may comprise first and second polarizing elements provided on a roundtrip path of light in the resonator; the first polarizing element being a polarizing element for always rotating the polarization of light by 90 degrees with each roundtrip, and the second polarizing element being a polarizing element driven by application of voltage causing a 45-degree rotation in the polarization of light passed by the second polarizing element; the second polarizing element being driven by application of voltage, upon supply of the input light, in the time between the first roundtrip of the second polarizing element made by the input light until the next roundtrip. Additionally, in this case, the first polarizing portion may be provided on the roundtrip path of light in the resonator, rotate the polarization of light by 90 degrees with each roundtrip when no voltage is applied, and rotate the polarization of light by 180 degrees with each roundtrip when a voltage sufficient to rotate the polarization of transmitted light by 45 degrees is applied; the first polarizing portion being driven by application of voltage, upon supply of the input light, in the time between the first roundtrip of the first polarizing portion made by the input light until the next roundtrip.

On the other hand, the second polarizing portion may be provided on the roundtrip path of light in the resonator, and driven by a voltage such as to rotate the polarization of transmitted light by 90 degrees, such that when the amplified light is to be extracted from the resonator, voltage is applied to drive the second polarizing portion from the time the amplified light passes through the second polarizing portion on one of the roundtrip paths until the time it passes through the second polarizing portion on the other the roundtrip path. Alternatively, the second polarizing portion may be provided on the roundtrip path of light in the resonator, and driven by a voltage such as to rotate the polarization of transmitted light by 45 degrees, such that when the amplified light is to be extracted from the resonator, voltage is applied in the time from one roundtrip of the amplified light until the next roundtrip.

In the regenerative optical amplifiers as described above, light reflected by a first polarizer for receiving light from outside the resonator can be supplied to the first polarizing portion as input light. Additionally, the second polarizing portion may change the polarization of amplified light amplified by the resonator to a polarization of light reflected by a second polarizer receiving light inside the resonator.

Furthermore, a more specific first structure for a regenerative optical amplifier according to the present invention may comprise a resonator having first and second reflective mirrors forming ends of a roundtrip path for light, and an amplifying portion for amplifying light in the roundtrip path; first and second Pockels cells respectively provided on first and second reflective mirror sides; and first and second polarizers respectively provided between the first and second Pockels cells and the amplifying portion. In this case, the first polarizer reflects light of a first polarization toward the first Pockels cell; the first Pockels cell is driven by application of voltage sufficient to rotate the polarization of transmitted light by 90 degrees in the time from when the light of a first polarization has passed through until it returns via the first reflective mirror, so as to convert light of the first polarization into light of a second polarization, the applied voltage being maintained for a predetermined period so as to rotate the polarization of transmitted light by 90 degrees; the second Pockels cell is driven by application of voltage when extracting amplified light amplified by making a roundtrip of the amplifying portion from the resonator, so as to convert the amplified light to amplified light of the first polarization; the amplified light of the first polarization being reflected by the second polarizer to be extracted outside of the resonator.

Additionally, as a second specific structure, the regenerative optical amplifier may comprise a resonator having first and second reflective mirrors forming ends of a roundtrip path for light, and an amplifying portion for amplifying light in the roundtrip path; first and second Pockels cells respectively provided on first and second reflective mirror sides; first and second polarizers respectively provided between the first and second Pockels cells and the amplifying portion; and a waveplate provided between the first Pockels cell and the first reflective mirror, for rotating the polarization of light by 90 degrees with each roundtrip. In this case, the first polarizer reflects light of a first polarization toward the first Pockels cell; the first Pockels cell is driven by application of voltage sufficient to rotate the polarization of transmitted light by 45 degrees in the time from when the light of a first polarization has been reflected at the first reflective mirror and completed one roundtrip of the first Pockels cell and the waveplate, been converted to light of a second polarization and completed a roundtrip of the amplifying portion side until it returns to the first Pockels cell, so as to convert light of the first polarization into light of a second polarization, the applied voltage being maintained for a predetermined period so as to rotate the polarization of transmitted light by 45 degrees; the second Pockels cell is driven by application of voltage when extracting amplified light amplified by making a roundtrip of the amplifying portion from the resonator, so as to convert the amplified light to amplified light of the first polarization; the amplified light of the first polarization being reflected by the second polarizer to be extracted outside of the resonator.

Furthermore, as a third specific structure, the regenerative optical amplifier may comprise a resonator having first and second reflective mirrors forming ends of a roundtrip path for light, and an amplifying portion for amplifying light in the roundtrip path; a first Pockels cell provided on the first reflective mirror side, whose optical axis is tilted in a direction such as to rotate the polarization of light by 45 degrees with each roundtrip; a second Pockels cell provided on the second mirror side; and first and second polarizers respectively provided between the first and second Pockels cells and the amplifying portion. In this case, the first polarizer reflects light of a first polarization toward the first Pockels cell; the first Pockels cell is driven by application of voltage sufficient to rotate the polarization of transmitted light by 45 degrees in the time from when the light of a first polarization has been reflected at the first reflective mirror and completed one roundtrip of the first Pockels cell and the waveplate, been converted to light of a second polarization and completed a roundtrip of said amplifying portion side until it returns to said first Pockels cell, so as to convert light of said first polarization into light of a second polarization, said applied voltage being maintained for a predetermined period so as to rotate the polarization of transmitted light by 180 degrees; said second Pockels cell is driven by application of voltage when extracting amplified light amplified by making a roundtrip of the amplifying portion from the resonator, so as to convert the amplified light to amplified light of the first polarization; the amplified light of the first polarization being reflected by the second polarizer to be extracted outside of the resonator.

In the regenerative optical amplifiers according to any of the first, second and third structures described above, the second Pockels cell may be driven by application of a voltage sufficient to rotate the polarization of transmitted light by 90 degrees in the time from when the amplified light has passed until it returns via the second reflective mirror so as to convert the amplified light into amplified light of the first polarization. Alternatively, the second Pockels cell may be driven by application of a voltage sufficient to rotate to polarization of transmitted light by 45 degrees from the time when light which has made a roundtrip of the amplifying portion to become the amplified light has completed a roundtrip until prior to the amplified light passing through so as to convert the amplified light into amplified light of the first polarization.

According to the present invention as described above, a first polarizing element for injecting input light to a resonator is driven continuously, and a second polarizing element is driven to extract the amplified light from the resonator, so that there is no need to quickly shut off (drop off) the voltages applied to the respective polarizing elements, and there is no need to repeatedly apply voltage to a single polarizing element at high speed. As a result, the application of voltage to a polarizing element such as a Pockels cell can be performed easily without requiring complicated drive circuits, and the amplification time in the resonator can be flexibly and precisely controlled, so as also to allow a light amplification operation to be repeated at high speed.

DETAILED DESCRIPTION OF THE INVENTION

<First Embodiment>
(1) Fundamental Principles

Figure 1:
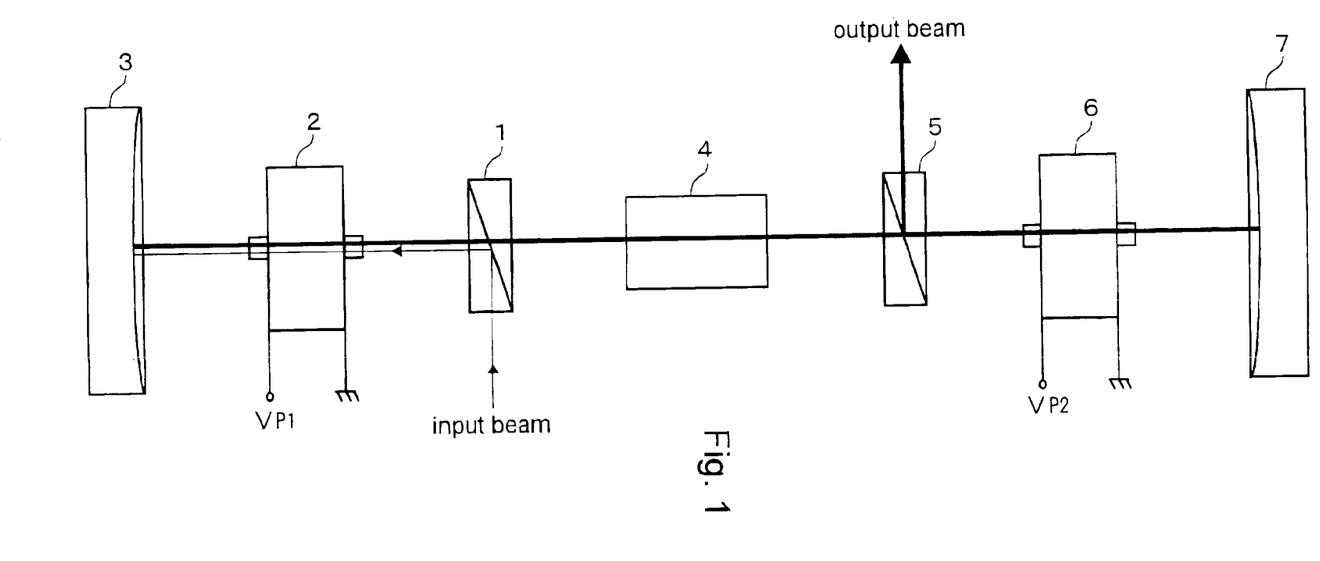
FIG. 1 is a schematic diagram showing the structure of a regenerative optical amplifier according to a first embodiment of the present invention.

Herebelow, embodiments of the present invention shall be described with reference to the drawings. FIG. 1 is a diagram showing the structure of a regenerative optical amplifier according to a first embodiment of the present invention.

When a voltage is applied to a Pockels cell such that the polarization of a laser light pulse is rotated by 90 degrees with each passage through the Pockels cell, the direction of polarization will be rotated by a total of 180 degrees upon passing twice through the Pockels cell, thus restoring the original polarization. Therefore, two Pockels cells are used, with voltage being applied to only the first Pockels cell. As a result, the polarization of a light pulse which has passed twice through the two Pockels cells will be rotated by 90 degrees. Next, if voltage is applied to both the first and second Pockels cells, the polarization of the light pulse will rotate by 180 degrees. As a result, the polarization of the light pulse becomes the same as the polarization of a light pulse when voltage is applied to a regenerative optical amplifier using only a single Pockels cell. That is, the use of two Pockels cells with a time delay between application of voltage can be made to be equivalent to the action of turning a single Pockels cell on and off.

The present embodiment is based on this fundamental principle. The detailed structure of the regenerative optical amplifier (to be referred to in the First Embodiment as "present regenerative optical amplifier") according to the present invention shall be described below.

(2) Structure

As shown in FIG. 1, the present regenerative optical amplifier comprises a polarizer 1, a Pockels cell 2, a reflective mirror 3, a laser crystal 4, a polarizer 5, a Pockels cell 6 and a reflective mirror 7. Of these components, the reflective mirror 3, laser crystal 4 and reflective mirror 7 form the resonator, with Pockels cell 2 and Pockels cell 6 being respectively positioned to the reflective mirror 3 side and reflective mirror 7 side of the resonator, a polarizer 1 being positioned between the Pockels cell 2 and the laser crystal 4, and a polarizer 5 being positioned between the Pockels cell 6 and the laser crystal 4.

The polarizer 1 reflects the component of incident light polarized in a certain direction and transmits the component of incident light polarized in the direction perpendicular to that certain direction. Here, the polarizer 1 is arranged so that the certain direction is aligned with the direction of polarization of the input beam supplied to the polarizer 1, so that the input beam is reflected by the polarizer 1 and directed toward the Pockels cell 2. In the present embodiment, which represents only one possible configuration, the polarizer 1 reflects S-polarized light which is linearly polarized in the direction perpendicular to the plane of the diagram, and transmits P-polarized light which is linearly polarized in the direction parallel to the plane of the diagram. S-polarized laser light pulses from a laser light source, not shown, are supplied to the polarizer I as input light. Alternatively, it is possible to use laser light pulses which include components other than those which are S-polarized as the input beam (since the polarizer 1 will reflect and separate out only the S-polarized component anyway).

The Pockels cell 2 is a polarizing element driven by a voltage $V_{P1}$ applied by a drive circuit, not shown. The direction of polarization of the transmitted light changes depending on the magnitude of the applied voltage $V_{P1}$. In the present invention, as one possible example, the Pockels cell rotates the direction of polarization of transmitted light by 90 degrees when a voltage $V_{P1}$ of 7 kV is applied. When the applied voltage $V_{P1}$ is 0 V (when no voltage is applied by the drive circuit), the direction of polarization of the transmitted light will not change, so that the light incident on the Pockels cell 2 will be allowed to pass with no change.

The reflective mirror 3 is a mirror that forms one end of the resonator, causing incident light to reflect back in the direction opposite the direction of incidence.

The laser crystal 4 is a lasing medium that amplifies the intensity of transmitted light. It can be excited to a state that enables amplification by being supplied with excitation light from a supply source, not shown.

The polarizer 5 is a polarizer similar to polarizer 1 as described above, and in the present embodiment, reflects S-polarized light while transmitting P-polarized light. However, while the polarizer 1 acts as an inlet for the input beam as described above, this polarizer 5 acts as an outlet for the output beam, reflecting amplified light pulses converted to S-polarized light by the operations described below, thus directing them outside the resonator in the form of output light.

The Pockels cell 6 is a polarizing element driven by a voltage $V_{P2}$ applied by a drive circuit, not shown. The direction of polarization of the transmitted light changes depending on the magnitude of the applied voltage $V_{P2}$. In one possible example of the present invention, the Pockels cell rotates the polarization of transmitted light by 90 degrees when a voltage $V_{P2}$ of 7 kV is applied. When the applied voltage $V_{P2}$ is 0 V (when no voltage is applied by the drive circuit), the polarization of the transmitted light does not change, so that the light incident on the Pockels cell 6 is allowed to pass unchanged.

The reflective mirror 7 is a mirror that forms the other end of the resonator, causing incident light to reflect back in the direction opposite the direction of incidence.

The present regenerative optical amplifier has the above-described components, and can be described as a resonator composed of a reflective mirror 3, a laser crystal 4 and a reflective mirror 7, provided with two pairs of Pockels cells and polarizers. Additionally as explained in the description given below, the pair formed by the Pockels cell 2 and polarizer 1 functions as means for trapping the input beam and the pair formed by the Pockels cell 6 and polarizer 5 functions as means for extracting an output beam.

(3) Operations

Figure 2:
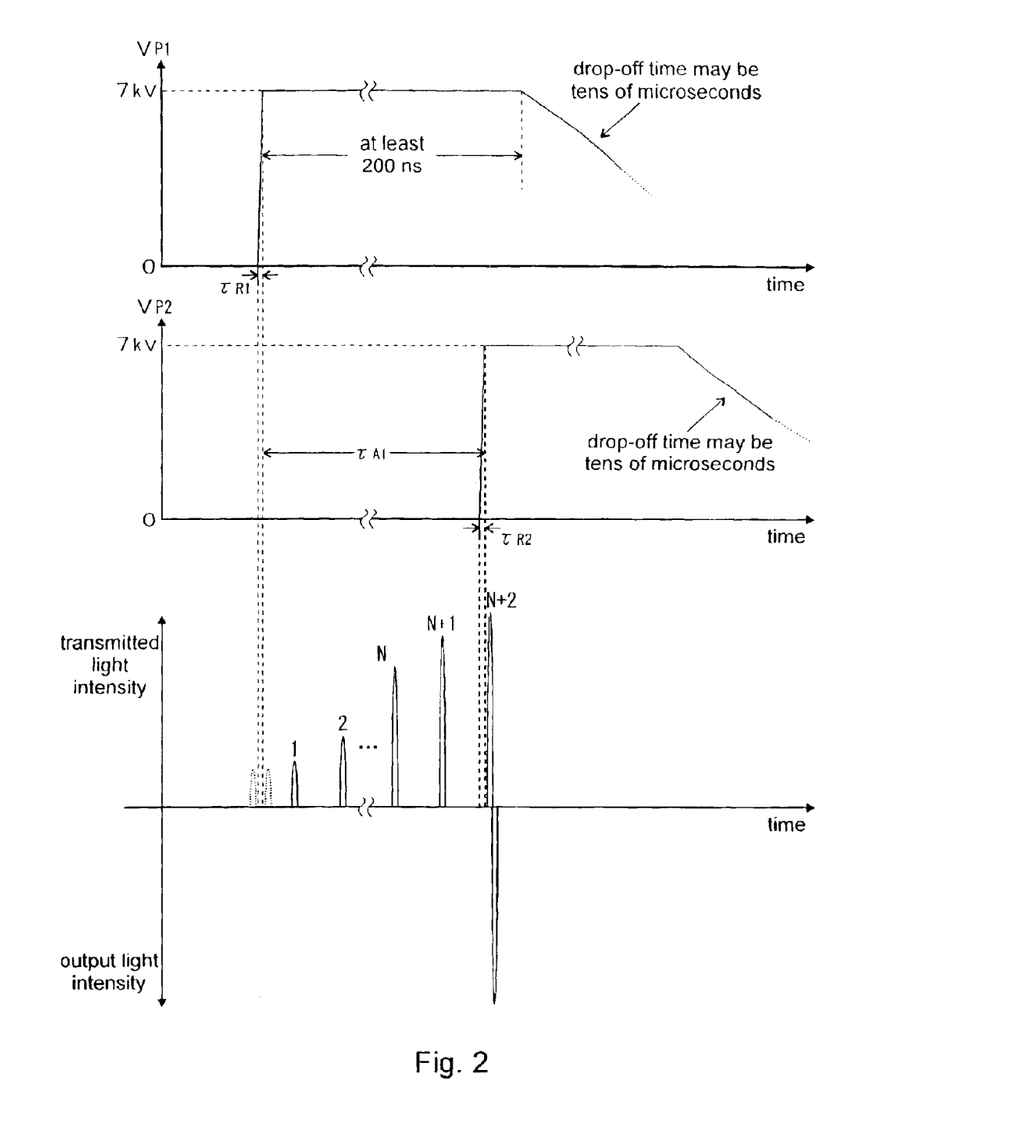
FIG. 2 is a timing chart showing the activity of the regenerative optical amplifier of FIG. 1 in terms of the voltage applied to the Pockels cell over time and the intensity of light pulses in the resonator.

FIG. 2 is a timing chart representing the operations of the present regenerative optical amplifier in terms of the voltage applied to the Pockels cell and the intensity of the light pulse in the resonator over time. In the timing chart of FIG. 2, the top portion shows the change in the applied voltage $V_{P1}$ over time, the horizontal axis indicating the time and the vertical axis indicating the magnitude of the voltage $V_{P1}$ applied to the Pockels cell 2. The middle portion shows the change in the applied voltage $V_{P2}$ over time, the horizontal axis indicating the time and the vertical axis indicating the magnitude of the voltage $V_{P2}$ applied to the Pockels cell 6. The bottom portion shows the change in the light pulse in the resonator and the output beam over time, the horizontal axis indicating the time as in the top portion, the upper half of the vertical axis indicating the intensity of light transmitted by the Pockels cell 6 (coming from the reflective mirror 7), and the lower half of the vertical axis indicating the intensity of the output beam. However, the intensity of the transmitted light indicated by the dotted lines on the upper half of the bottom portion is the intensity of input light which initially completes a roundtrip of the Pockels cell 2. Corresponding positions on the time axis between the top portion, middle portion and bottom portion are represented by the dashed lines. Herebelow, the functions of the present regenerative optical amplifier shall be described with reference to the timing chart.

In the present regenerative optical amplifier, as described above, an S-polarized laser light pulse is supplied as the input beam, and this input beam is reflected by the polarizer 1 and directed to the Pockels cell 2. At this time, the applied voltage $V_{P1}$ is 0V, so that the input beam passes through the Pockels cell 2 unchanged to reach the reflective mirror 3. Therefore, the input beam is reflected by the reflective mirror 3 while still S-polarized, and returns to the Pockels cell 2, but during that time, the applied voltage $V_{P1}$ rises to 7 kV, which is a voltage sufficient to cause the polarization of light transmitted by the Pockels cell to be rotated by 90 degrees. That is, as shown in the top portion and bottom portion of FIG. 2, a voltage $V_{P1}$ of 7 kV is applied to the Pockels cell 2 in the time it takes for the input beam, once having passed through, to return via the reflective mirror 3 (while the input beam is traveling between the Pockels cell 2 and the reflective mirror 3), and this applied voltage of $V_{P1}$ is maintained.

As a result, the polarization of the input beam is rotated by 90 degrees upon passing once again through the Pockels cell 2, thereby forming a P-polarized light pulse which is passed by the polarizer 1. Then, the beam passes through the laser crystal 4 and similarly passes through the polarizer 5, through the Pockels cell 6, and is reflected by the reflective mirror 7. At this time, the applied voltage $V_{P2}$ becomes 0 V, and the P-polarized light pulse passes through the Pockels cell 6 unchanged, so that even after being reflected by the reflective mirror 3, the light pulse continues through the Pockels cell 6, the polarizer 5, the laser crystal 4 and the polarizer 1 while remaining P-polarized, to arrive once again at the Pockels cell 2.

At the Pockels cell 2, the applied voltage $V_{P1}$ of 7 kV is maintained, so that the P-polarized light pulse which enters is converted to S-polarized light. However, since the applied voltage $V_{P1}$ of 7 kV is still maintained at the Pockels cell when the light pulse which has become S-polarized returns via the reflective mirror 3, the light is once again P-polarized after its return passage through the Pockels cell 2. Accordingly, the P-polarized light pulse will continue to pass through the polarizer 1 so as to complete a roundtrip of the resonator.

Subsequently, in the same vein, the light pulse in the resonator is converted from P polarization to S polarization and back to P polarization with each roundtrip of the Pockels cell 2, thus continuing to be transmitted by both the polarizer 1 and the polarizer 5 so as to oscillate back and forth inside the resonator. The present regenerative optical amplifier thereby traps input light in the resonator, which repeatedly passes through and is amplified by the laser crystal 4. That is, with the present regenerative optical amplifier, a voltage $V_{P1}$ which rises to a value such as to enable rotation of the polarization of transmitted light by 90 degrees is simply applied to the Pockels cell 2 between initial passage of the supplied input beam through the Pockels cell 2 and its return to the Pockels cell 2, as a result of which the input beam which has been converted to a P-polarized light pulse by the Pockels cell 2 at the time of application of the voltage $V_{P1}$ is trapped in the resonator, and injected as a seed light pulse for amplification by the resonator.

Further, after the trapped light pulse is amplified by repeated passage through the laser crystal 4, a voltage is applied to the Pockels cell 6 to extract the amplified light pulse (see middle and bottom portions of FIG. 2; the numbers appended to the transmitted light intensities in the bottom portion indicate the number of roundtrips of the resonator made by each pulse). That is, between the time that the amplified light pulse passes through the Pockels cell 6 and returns after reflection from the reflective mirror 7 (while the amplified light pulse is traveling between the Pockels cell 6 and the reflective mirror 7), the voltage $V_{P2}$ is made to rise to 7 kV, and a voltage is applied to the Pockels cell 6 such as to rotate the polarization of the transmitted light by 90 degrees. Then, the polarization of the amplified light pulse is rotated by 90 degrees upon passing through the Pockels cell 6, thus converting it to an S-polarized light pulse which is then reflected by the polarizer 5. As a result, the S-polarized amplified light pulse is outputted from the polarizer 5, and a high-output amplified light pulse is extracted as output light.

Any input light which is newly supplied during amplification of the trapped light pulse is reflected by the polarizer 1 and converted into P-polarized light by the Pockels cell 2, but after being reflected by the reflective mirror 3 and passing again through the Pockels cell 2, is returned to S-polarized light, to be reflected by the polarizer 1 away from the resonator. Additionally, input light which is supplied while the voltage $V_{P1}$ is not being applied to the Pockels cell 2 is reflected by the polarizer 1 and passes unchanged through the Pockels cell 2, is reflected by the reflective mirror 3 and returns back through the Pockels cell 2 unchanged, thus also being reflected by the polarizer 1 and escaping from the resonator. Therefore, when the voltage $V_{P1}$ is applied as described above, only the light pulse trapped in the resonator is amplified, and the amplified light pulse formed by amplification of only that light pulse is allowed to escape from the resonator by applying the voltage $V_{P2}$ as described above.

(4) Effects

In the present regenerative optical amplifier, the entrapment and extraction of light pulses is performed as described above, but the rise time $\tau_{R1}$ (see top portion of FIG. 2) of the voltage $V_{P1}$ applied at the time of entrapment must be shorter than the time required for the input light which has passed through the Pockels cell 2 to return to the Pockels cell 2, this being on the order of a few ns to about 10 ns. Additionally, the rise time $\tau_{R2}$ (see middle portion of FIG. 2) of the voltage $V_{P2}$ applied at the time of extraction must be shorter than the time required for an amplified light pulse which has passed through the Pockels cell 6 to return to the Pockels cell 6, this being also on the order of a few ns to about 10 ns.

For example, if the distance between the Pockels cell 6 and the reflective mirror 7 is 100 cm, the amplified light pulse will return to the Pockels cell 6 in (roundtrip optical path length)/(speed of light)=2000 cm/($3\times10^{10}$ cm/s)=6.67 ns, so that the rise time $\tau_{R2}$ must be less than 6.67 ns. In this case, when assuming that a light pulse having an extremely short temporal width of about 0.05 ns is trapped in the resonator as the input beam, the direction of polarization of the entire amplified light pulse will rotate by 90 degrees and the entire amplified light pulse will be outputted from the resonator as indicated by the bottom portion of FIG. 2, as long as the voltage $V_{P2}$ of the Pockels cell is turned on within 6.67 ns after amplification of the light pulse.

In this way, even with the present regenerative optical amplifier, the voltage applied to the Pockels cell must rise quickly. However, the applied voltage $V_{P1}$ is maintained even after the initial rise as described above, and the amplified light pulse is extracted with the applied voltage $V_{P2}$ up, so that the voltages applied to the Pockels cells are not such as to need to rise quickly and immediately drop away. Therefore, in the present regenerative optical amplifier, it is sufficient to hasten the rise times of the voltages applied respectively to the Pockels cell 2 and the Pockels cell 6, and there is no need for complicated circuits to hasten the drop time. The drop times of the voltages $V_{P1}$ and $V_{P2}$ need only be made fast enough to accommodate the next optical amplification, so that if the above-described actions are repeated at a few tens of kHz, the voltages $V_{P1}$ and $V_{P2}$ need only be made to fall away within the span of about a few tens of $\mu s$.

Additionally, in the present regenerative optical amplifier, the amplification time $\tau_{A1}$ for amplifying injected seed light pulses lies between the initial rise of the voltage $V_{P1}$ and the initial rise of the voltage $V_{P2}$ (see the top and middle portions of FIG. 2). That is, in the present regenerative optical amplifier, the amplification time $\tau_{A1}$ is determined by the time between the initial rise of the applied voltage for one of the Pockels cells and the initial rise of the applied voltage for the other Pockels cell. Therefore, there are no restrictions on control of the amplification time $\tau_{A1}$, and the amplification time $\tau_{A1}$ can be precisely controlled as long as the rise waveforms of the voltage $V_{P1}$ and voltage $V_{P2}$ are made to match. For example, after turning on the applied voltage $V_{P1}$ to a first Pockels cell 2, the applied voltage $V_{P2}$ to the second Pockels cell 6 can be turned on immediately without any load, thus enabling light pulses of extremely short amplification times which are not possible with conventional regenerative optical amplifiers to be trapped inside the resonator.

However, the time over which the applied voltage $V_{P1}$ is to be maintained after rising must be set to a predetermined period to enable the required amplification time $\tau_{A1}$ to be obtained. In order to suitably and flexibly control the amplification time $\tau_{A1}$, it is possible, for example, to set the time over which the applied voltage $V_{P1}$ is maintained after the initial rise to at least 200 ns as indicated by the upper portion of FIG. 2, but in order to make the amplification time shorter, it could be as short as 50 ns (it can be set as appropriate to need).

Furthermore, according to the present regenerative optical amplifier, it is sufficient to hasten only the rise times of the applied voltages $V_{P1}$ and $V_{P2}$, and they can be applied separately to the Pockels cells, so that the load on the drive circuits of the Pockels cells is largely reduced. For this reason, the above-described actions can easily be repeated at high speed, and optical amplification of laser light pulses can be repeated at high speeds to obtain high-speed amplified light pulses of kHz order.

Additionally, with the present regenerative optical amplifier, there is no need to turn the voltages applied to the respective Pockels cells off in a few ns, and the on/off operation does not need to be repeated in a few ns for a single optical amplification, thereby dampening the impact of the operation of the Pockels cells and reducing the frequency of operation of the Pockels cells. As a result, the deterioration of the Pockels cells due to operation is reduced, thus also improving the durability of the regenerative optical amplifier. Additionally, since the polarizer 1 is used as the inlet for the input beam and the polarizer 5 is used as the outlet for the output beam, there is no need to provide separating means for the output beam as provided outside the resonator in conventional regenerative optical amplifiers such as shown in FIG. 5, thereby enabling the regenerative optical amplifier to be made more compact.

According to the present embodiment, two Pockels cells are used, with the respective Pockels cells being driven with a high-speed applied voltage only on the initial rise, so that the drive voltage control of the Pockels cells is greatly simplified as compared with conventional regenerative optical amplifiers that require the applied voltage to the Pockels cells to rise quickly (in a few ns) and to immediately drop away again, or conventional regenerative optical amplifiers that require the applied voltage to the Pockels cells to rise quickly and to drop quickly after the passage of the amplification time. Accordingly, the drive circuit design for drive control of the Pockels cells is made simple, while enabling precise amplification of the laser beam, reducing the cost of equipment and making the apparatus more compact.

<Second Embodiment>

(1) Fundamental Principles

In regenerative optical amplifiers having polarizers for reflecting light polarized in a certain direction and transmitting light polarized in a direction perpendicular to that certain direction as the inlet and outlet of light, the light can be trapped inside the resonator and amplified as long as the light inside the resonator is light that is polarized in said perpendicular direction at the time of passage through the polarizers. For this reason, in the above-described first embodiment, the direction of polarization of the supplied input light was first rotated by 90 degrees in the Pockels cell 2, and thereafter, the direction of polarization of the light pulse making a roundtrip through the resonator was rotated by 180 degrees by the Pockels cell 2, thereby converting the light pulse into P-polarized light when passing through the polarizer 1 and polarizer 5.

That is, in the above-described first embodiment, the fundamental principle is to first rotate the direction of polarization of the input light by 90 degrees, then to subsequently rotate the direction of polarization of the light by 180 degrees with each roundtrip. As polarizing elements to function on this principle, the regenerative optical amplifier according to the above-described first embodiment uses a Pockels cell 2 which does not require a quick drop off of the applied voltage, but such polarizing elements could be formed using other types of optical elements. For example, in the second embodiment of the present invention, a combination of a Pockels cell and quarter-wave plate is used to form a polarizing element that can achieve a similar function.

(2) Structure

Figure 3:
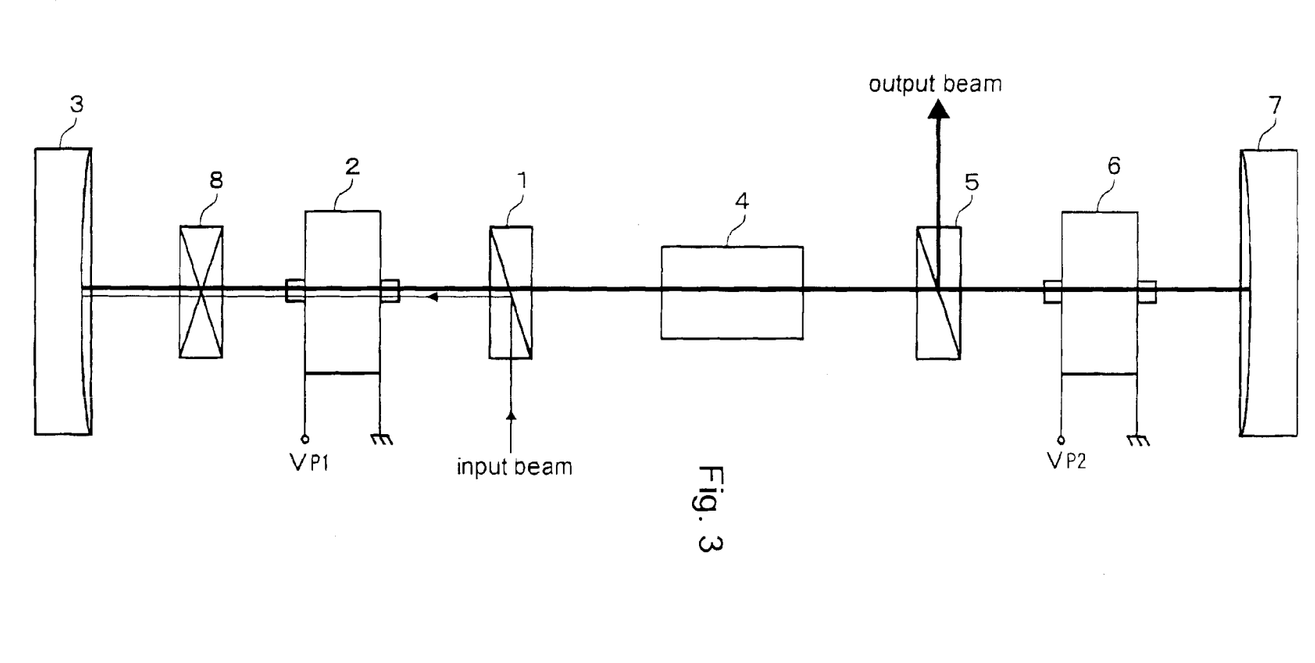
FIG. 3 is a schematic diagram showing the structure of a regenerative optical amplifier according to a second embodiment of the present invention.

FIG. 3 is a diagram showing the structure of a regenerative optical amplifier according to a second embodiment of the present invention. The regenerative optical amplifier of the present embodiment (hereinafter referred to as "present regenerative optical amplifier" in this <Second Embodiment>), as shown in the drawing, comprises a polarizer 1, a Pockels cell 2, a reflective mirror 3, a laser crystal 4, a polarizer 5, a Pockels cell 6, a reflective mirror 7 and a quarter-wave plate 8.

Among these components, the polarizer 1, Pockels cell 2, reflective mirror 3, laser crystal 4, polarizer 6 and reflective mirror 7 are physically identical to the components of the above-described first embodiment, so that they will be indicated by the same reference numbers as in the first embodiment and their respective descriptions shall be omitted, but they functionally perform effects which are specific to the present embodiment. While the details will be made clear in the below-given description of the functions, it is possible in the present embodiment, for example, for the mode of application of voltage to the Pockels cell 2 to be different from that of the first embodiment, the function of the Pockels cell 2 to be different from that of the first embodiment, and the mode of propagation of light through each component to differ from the first embodiment as well.

The quarter-wave plate 8 is a wave plate that can convert linearly polarized transmitted light into circularly polarized light, and can convert such circularly polarized light into light which is linearly polarized in a direction rotated by 90 degrees with respect to the original linearly polarized light. The quarter-wave plate 8 is positioned between the Pockels cell 2 and the reflective mirror 3. That is, the quarter-wave plate 8 can function as a type of polarizing element that rotates the direction of polarization of light upon completing a roundtrip, in such a way that light entering from the Pockels cell 2 is converted to circularly polarized light upon passing through the quarter-wave plate 8, the circularly polarized light is reflected by the reflective mirror 3, and upon passing once again through the quarter-wave plate 8, becomes light whose direction of polarization is rotated by 90 degrees with respect to the direction of polarization of the original light.

The physical structure of the present regenerative optical amplifier is such that a quarter-wave plate 8 for rotating the polarization of light which has completed a roundtrip in this way by 90 degrees is provided between the Pockels cell 2 and the reflective mirror 3 in a regenerative optical amplifier having a structure that is otherwise in accordance with the above-described first embodiment (the reflective mirror 3, laser crystal 4 and reflective mirror 7 form a resonator, Pockels cell 2 and Pockels cell 6 are respectively positioned on the reflective mirror 3 side and reflective mirror 7 side of the resonator, polarizer 1 is positioned between the Pockels cell 2 and the laser crystal 4, polarizer 5 is positioned between the Pockels cell 6 and the laser crystal 4, and in addition thereto, a quarter-wave plate 8 is positioned between the Pockels cell 2 and the reflective mirror 3). Additionally, as explained in the following description, the group formed by the Pockels cell 2, quarter-wave plate 8 and polarizer 1 function as means for trapping an input beam, and the group formed by the Pockels cell 6 and polarizer 5 function as means for extracting an output beam.

(3) Operations

In the present regenerative optical amplifier, the presence of the quarter-wave plate 8 in the resonator enables the input light to complete a roundtrip of the laser crystal 4 side of the resonator without having to apply voltage to the Pockels cell. That is, when an S-polarized laser light pulse is supplied as the input light from a laser light source, not shown, this input light is reflected by the polarizer 1 and passes through the Pockels cell 2, then is circularly polarized by the quarter-wave plate 8, reflected by the reflective mirror 3, and passes once again through the quarter-wave plate 8 to form a P-polarized light pulse (input light whose polarization is rotated by 90 degrees). As a result, the supplied input beam becomes a P-polarized light pulse upon returning from the reflective mirror 3 to the polarizer 1, even without the application of voltage to the Pockels cell 2, so as to be able to pass through the polarizer 1, the laser crystal 4, polarizer 5 and Pockels cell 6, reflected at the reflective mirror, and to pass through the Pockels cell 6, polarizer 5, laser crystal 4, polarizer 1 and Pockels cell 2, and return to the quarter-wave plate 8 while remaining in the form of P-polarized light as long as no voltage has been applied to the Pockels cell 6. Then, at the quarter-wave plate 8, the pulse is circularly polarized, reflected by the reflective mirror 3, passes again through the quarter-wave plate 8 to form an S-polarized light pulse, and after passing through the Pockels cell 2, is reflected by the polarizer 1 to be directed outside the resonator.

Figure 4:
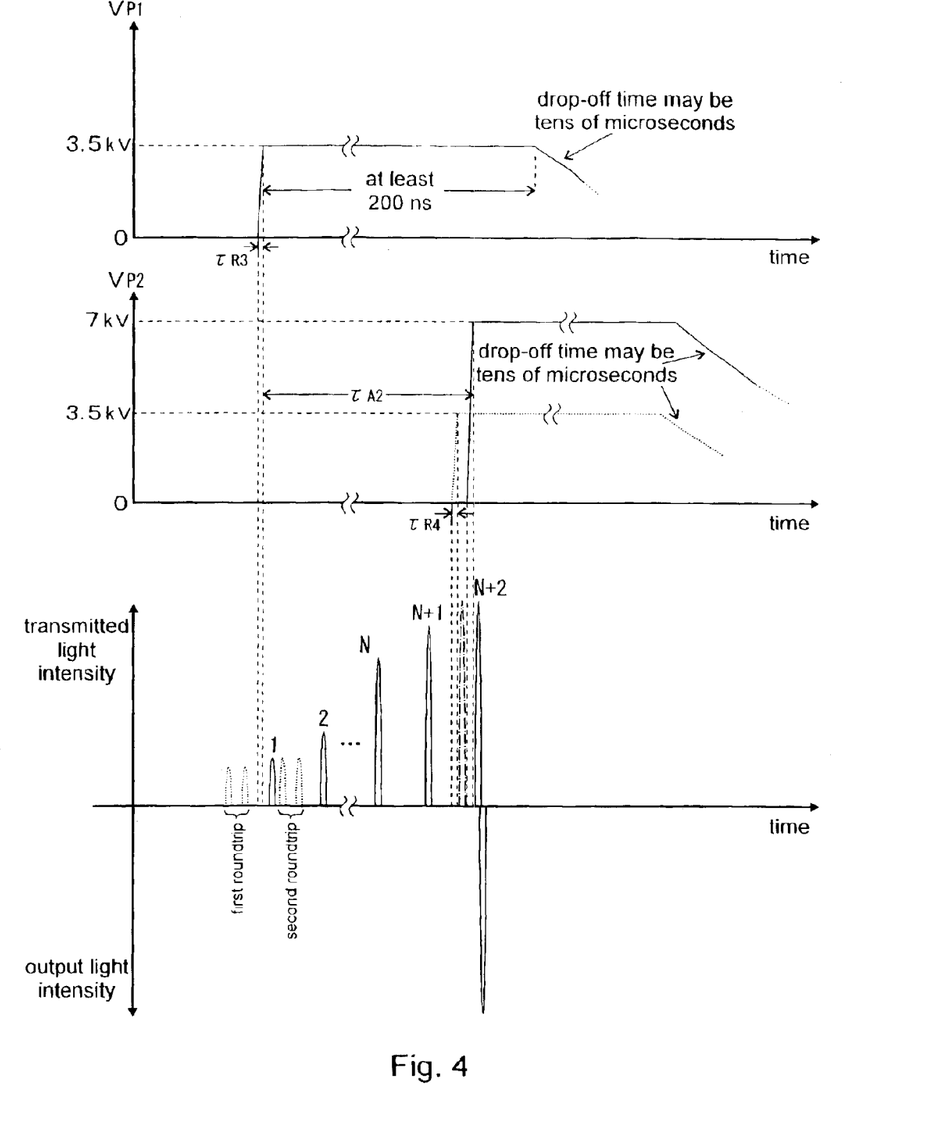
FIG. 4 is a timing chart showing the activity of the regenerative optical amplifier of FIG. 3 in terms of the voltage applied to the Pockels cell over time and the intensity of light pulses in the resonator.

With respect to the quarter-wave plate 8 which rotates the direction of polarization of light pulses by 90 degrees in this way, the present regenerative optical amplifier is controlled to first rotate the polarization of the input beam by 90 degrees, and subsequently to rotate the polarization of the light pulses by 180 degrees. FIG. 4 is a timing chart representing the operation of the present regenerative optical amplifier in terms of the applied voltage to the Pockels cells and the intensity of the light pulses over time, with the top portion, middle portion and bottom portion indicating the same information as in the timing chart of the above-described FIG. 2 (where the horizontal axes of each of the portions indicates the time, the vertical axis of the top portion indicates the magnitude of the voltage $V_{P1}$ applied to the Pockels cell 2, the vertical axis of the middle portion indicates the magnitude of the voltage $V_{P2}$ applied to the Pockels cell 6, the top half of the vertical axis of the bottom portion indicates the intensity of the light transmitted by the Pockels cell 6 (coming from the reflective mirror 7), and the bottom half indicates the intensity of the output beam). However, in the top half of the bottom portion, the intensity of the transmitted light indicated by the dotted line indicates the intensity of transmitted light propagating in the Pockels cell until the second roundtrip from the beginning of operation, and the intensity of the transmitted light indicated by the single-dotted chain line indicates the intensity of the light transmitted by the Pockels cell 6 from the polarizer 5 side at the time of extraction of the amplified light pulse. The corresponding positions on the time axis of the top portion, middle portion and bottom portion are shown by the dashed lines. Herebelow, the operation of the present regenerative optical amplifier shall be explained with reference also to this timing chart.

In the present regenerative optical amplifier, the voltage $V_{P1}$ is not applied (the voltage $V_{P1}$ is kept at 0 V) until the input beam which has been supplied has completed one roundtrip of the Pockels cell. Therefore, the S-polarized laser light pulse supplied as an input beam is reflected by the polarizer 1 as described above, passes through the Pockels cell 2, then is circularly polarized by the quarter-wave plate 8, reflected by the reflective mirror 3, passes again through the quarter-wave plate 8 to form a P-polarized light pulse, passes unchanged through the Pockels cell 2 and is transmitted by the polarizer 1. Then, since no voltage $V_{P2}$ is applied at this time, the P-polarized light pulse which has been transmitted by the polarizer 1 passes through the laser crystal 4, polarizer 5 and Pockels cell 6 while still P-polarized, is reflected by the reflective mirror 7, passes through the Pockels cell 6, polarizer 5, laser crystal 4 and polarizer 1, and returns to the Pockels cell 2, but during this time, the applied voltage $V_{P1}$ is brought to 3.5 kV, so as to apply a voltage to the Pockels cell 2 causing a 45-degree rotation in the polarization of transmitted light. That is, as shown in the top and bottom portions of FIG. 4, a voltage $V_{P1}$ of 3.5 kV is applied to the Pockels cell 2 between the time of the first roundtrip of the input beam until the time of its second roundtrip (while the input beam converted into a P-polarized light pulse makes a round trip of the polarizer 1, laser crystal 4, polarizer 5, Pockels cell 6 and reflective mirror 7), and this applied voltage $V_{P1}$ of 3.5 kV is maintained. Usually, the change in the direction of polarization of light transmitted by Pockels cells is proportional to the applied voltage, so that the Pockels cell 2 will be in a state such as to rotate the direction of polarization of transmitted light by 45 degrees (half the amount of rotation of 90 degrees as in the first embodiment) by applying a voltage of 3.5 kV (half the voltage of 7 kV applied in the first embodiment).

As a result, the P-polarized light pulse which has completed a roundtrip of the laser crystal 4 side and returned to the Pockels cell 2 has a polarization which is rotated by 45 degrees upon passing through the Pockels cell 2. Then, the light pulse is first converted to circularly polarized light by the quarter-wave plate 8, reflected by the reflective mirror 3, and upon passing once again through the quarter-wave plate 8, becomes a light pulse whose polarization has been rotated by 90 degrees, and the direction of polarization is rotated by a further 45 degrees upon passing once again through the Pockels cell 2. That is, the P-polarized light pulse which has made a roundtrip of the laser crystal 4 side has the direction of polarization rotated by 90 degrees (45 degrees×2) by going both ways through the Pockels cell 2 to which an applied voltage $V_{P1}$ of 3.5 kV is maintained, and the direction of polarization is rotated by 90 degrees also due to going both ways through the quarter-wave plate 8. Therefore, the light pulse which passes through the Pockels cell 2 and proceeds once again to the polarizer I has a direction of polarization which is rotated by a total of 180 degrees, and is thus returned to a P-polarized light pulse, so that it will be able to pass through the polarizer 1 as described above and continue to the laser crystal 4 side.

Subsequently, in the same manner, the direction of polarization of the light pulse in the resonator is rotated by 180 degrees with each roundtrip of the Pockels cell 2 and quarter-wave plate 8, so as to remain P-polarized when going to the polarizer 1 side and therefore transmitted by the polarizer 1 and polarizer 5, and continue to go back and forth inside the resonator (after one roundtrip, the polarization is rotated by 180 degrees to form P-polarized light as described above, and after two roundtrips, the polarization is rotated by 360 degrees so as to return to P-polarized light whose polarization is nil, and thereafter, the light pulse continues to go back and forth inside the resonator while repeating this process). In the present regenerative optical amplifier, the input beam is trapped in the resonator in this way, and is amplified by repeated passage through the laser crystal 4.

That is, in the present regenerative optical amplifier, a voltage $V_{P1}$ which rises to a voltage capable of rotating the polarization of transmitted light by 45 degrees is simply applied to the Pockels cell 2 during the time it takes for a supplied input beam after once making a roundtrip of the Pockels cell 2 to return once again to the Pockels cell 2, and at the moment the voltage $V_{P1}$ is applied, the light pulse which is maintained as P-polarized light by the Pockels cell 2 and quarter-wave plate 8 is trapped in the resonator, thus injecting a seed light pulse which is to be amplified by the resonator.

Then, after the trapped light pulse has been amplified by repeated passage through the laser crystal 4, a voltage is applied to the Pockels cell 6 to extract the amplified light pulse (see middle portion and bottom portion of FIG. 4; the numbers appended to the transmitted light intensities of the bottom portion denote the number of roundtrips of the resonator each transmitted light beam has made). This amplified light pulse can be extracted in a manner similar to the above-described first embodiment. That is, as indicated by the solid line in the middle portion of FIG. 4, the applied voltage $V_{P2}$ must be raised to 7 kV between the time it takes for the amplified light pulse to pass through the Pockels cell 6 and return via the reflective mirror 7, so as to apply a voltage that rotates the polarization of light transmitted by the Pockels cell 6 by 90 degrees. Then, the polarization of the amplified light pulse is rotated by 90 degrees after passage through the Pockels cell 6 to become an S-polarized light pulse, which is reflected by the polarizer 5. As a result, the S-polarized amplified light pulse is outputted from the polarizer 5, to extract a high-power amplified light pulse as the output beam.

Here, the extraction of the amplified light pulse can be performed by applying a voltage (a voltage of 3.5 kV as in the above-described Pockels cell 2) which causes a 45 degree rotation of the direction of rotation of the light transmitted by the Pockels cell 6. In this case, a voltage $V_{P2}$ of 3.5 kV, sufficient to rotate the polarization of light transmitted by the Pockels cell 6 by 45 degrees, is made to rise from the time the amplified light pulse passes through the Pockels cell 6 from the reflective mirror 7 side in the previous roundtrip until it returns once again to the Pockels cell 6 from the polarizer 5 side (between the time that the transmitted light intensity of the (N+1)-th roundtrip appears until the time that the transmitted light intensity of the single-dotted chain line appears). Then, the direction of polarization of the amplified light pulse rotates by 45 degrees when passing through the Pockels cell 6 from the polarizer 5 side, and after reflection by the reflective mirror 7, the direction of polarization is rotated by a further 45 degrees upon passing through the Pockels cell 6. That is, the direction of polarization of the amplified light pulse rotates by 90 degrees after completion of the roundtrip of the Pockels cell 6, thus forming an S-polarized light pulse that is reflected by the polarizer 5. As a result, the S-polarized amplified light pulse is outputted from the polarizer 5 as described above, and the high-output amplified light pulse is extracted as an output beam.

Input light which is newly supplied during amplification of the trapped light pulse is reflected by the polarizer 1, and makes a roundtrip of the Pockels cell 2 and quarter-wave plate 8, at which point the polarization is rotated by 180 degrees so as to return it to S-polarized light which is reflected outside of the resonator by the polarizer 1 without completing the roundtrip of the laser crystal 4 side. Additionally, the input light supplied while voltage is not applied to the Pockels cells will make one roundtrip of the resonator as described above, but upon making two roundtrips of the quarter-wave plate 8, will return to S-polarized light, and will therefore be reflected outside of the resonator by the polarizer 1. Hence, in the present embodiment as well, only an amplified light pulse formed by amplifying the light pulse trapped in the resonator by applying the voltage $V_{P1}$ will be extracted as the output beam.

(4) Effects

In the present regenerative optical amplifier, light pulses are trapped and extracted in the above manner, but as with the regenerative optical amplifier according to the above-described first embodiment, the voltage applied to the Pockels cell 2 and Pockels cell 6 does not need to quickly drop immediately after rising, and the amplification time $\tau_{A2}$ (see the middle portion of FIG. 4) is determined by the time between the initial rises in the voltages applied to the respective Pockels cells. Furthermore, the voltage $V_{P1}$ applied to the Pockels cell 2 when trapping the light pulse in the present regenerative optical amplifier is 3.5 kV, or half that of the above-described first embodiment, and the voltage $V_{P2}$ applied to the Pockels cell 6 also needs only to be 3.5 kV to allow extraction of the amplified light pulse.

Therefore, according to the present regenerative optical amplifier, functions and effects of a similar nature to the regenerative optical amplifier according to the first embodiment can be obtained with an applied voltage to the Pockels cells that is half that of the regenerative optical amplifier according to the first embodiment, thus providing an enhancement of the effects. For example, since the applied voltages to the Pockels cells need rise to only half the voltage value of the above-described first embodiment, the drive circuit for the Pockels cells can be more readily constructed, enabling more flexible and precise control of the amplification time. Additionally, the load on the drive circuits of the Pockels cells is made much lighter, making it easier to obtain high-speed amplified light pulses by high-speed repetition of amplification of laser light pulses, and reducing the deterioration due to driving the Pockels cells, so as also to improve the durability of the regenerative optical amplifier.

Furthermore, the rise time $\tau_{R3}$ (see top portion of FIG. 4) of the voltage $V_{P1}$ applied at the time of entrapment need only be shorter than the time it takes for the input beam, having once made a roundtrip of the Pockels cell 2, to return once again to the Pockels cell 2. Additionally, when the voltage $V_{P2}$ applied to the Pockels cell 6 at the time of extraction of the amplified light pulse is made 3.5 kV, the rise time $\tau_{R4}$ (see middle portion of FIG. 4) needs only to be shorter than the time it takes for the amplified light pulse, having made a roundtrip of the Pockels cell 6, to return once again to the Pockels cell 6 (this extraction of the amplified light pulse by application of voltage can be employed in the first embodiment as well). However, if the amplified light pulse passes through the Pockels cell 6 while the applied voltage $V_{P2}$ is rising, the light pulse of the output beam becomes a double pulse, and the timing of the applied voltage $V_{P2}$ must be appropriately controlled so that the double pulse will not appear in the output beam.

On the other hand, the drop off of the applied voltage $V_{P1}$ and applied voltage $V_{P2}$ need only be such as to be in time for the next light amplification operation as in the above-described first embodiment (e.g. if the above-described operation is to be repeated at a few kHz, it is sufficient for the applied voltage $V_{P1}$ and applied voltage $V_{P2}$ to drop off in a period of a few tens of μs as seen in the top portion and middle portion of FIG. 4). Additionally, the time that the applied voltage $V_{P1}$ is to be maintained after rising can be such as to ensure that the amplification time $\tau_{A2}$ which is necessary after presetting a certain period is obtained, just as with the above-described first embodiment (for example, it can be set to about 200 ns as indicated in the top portion of FIG. 4, but can alternatively be set as needed; for example, if the amplification time is to be made shorter, it can be set to about 50 ns).

<Third Embodiment>

When the orientation of the optical axis of a Pockels cell is tilted with respect to the optical axis of transmitted light when functioning in its normal capacity as a polarizing element, it functions as a wave plate when no voltage is applied. Therefore, in the third embodiment of the present invention, the quarter-wave plate 8 provided in the above-described second embodiment is made up for (without providing the quarter-wave plate 8) by tilting the direction of the optical axis of the Pockels cell 2 with respect to the optical axis of the resonator to enable the Pockels cell 2 to function also as a quarter-wave plate 8.

That is, the resonator is formed from a reflective mirror 3, a laser crystal 4 and a reflective mirror 7 just as in the above, a Pockels cell 2 and a Pockels cell 5 are respectively positioned on the reflective mirror 3 side and reflective mirror 7 side of the resonator, a polarizer 1 is positioned between the Pockels cell 2 and the laser crystal 4, and a polarizer 5 is positioned between the Pockels cell 6 and the laser crystal 4. Additionally, the optical axis of the Pockels cell 2 is tilted (e.g. by 5–6 degrees) such as to rotate the direction of polarization of light by 90 degrees upon making a roundtrip, just as with the above-described quarter-wave plate 8, when no voltage is applied to the Pockels cell, and at the time of entrapment of the light pulse, a voltage (3.5 kV) causing a 45 degree rotation in the direction of polarization of transmitted light is applied to the tilted Pockels cell 2.

As a result, the tilted Pockels cell 2 functions similarly to the quarter-wave plate 8 of the above-described second embodiment when no voltage is applied (causing an oscillating light pulse to become circularly polarized on the initial passage and to become a light pulse whose direction of polarization has rotated by 90 degrees on the return passage), and when voltage is applied, functions similarly to the Pockels cell 2 and quarter-wave plate 8 in the above-described second embodiment (rotating the polarization of a light pulse by 180 degrees with each roundtrip). Therefore, with the regenerative optical amplifier according to this third embodiment, a voltage application mode similar to that shown in the top portion and middle portion of FIG. 4 results in transmitted light intensity and output beam intensity similar to that shown in the bottom portion, thus providing the same effects as the above-described second embodiment.

Since the third embodiment involves some trial and error in order to determine the degree of tilt of the Pockels cell 2, it requires more work to set up the components (positioning, installation and axial alignment), but has the advantages that not only is the applied voltage to the Pockels cell small as compared with the above-described first embodiment, but it also does not require a quarter-wave plate as in the above-described second embodiment. The above-described first embodiment has the advantage that although the voltage applied to the Pockels cells is high as compared with the other embodiments, the structure is the simplest, making it easier to set up the components. Additionally, while the second embodiment requires a quarter-wave plate and requires more components, thus increasing the work required for setup, the voltage applied to the Pockels cells is small as compared with the first embodiment, and does not require the tilt angle of the Pockels cell to be determined by trial and error as with the third embodiment.

What is claimed is:

1. A regenerative optical amplifier comprising:
   a resonator having first and second reflective mirrors forming ends of a roundtrip path for light, and an amplifying portion for amplifying light in said roundtrip path;
   first and second Pockels cells respectively provided on first and second reflective mirror sides; and
   first and second polarizers respectively provided between said first and second Pockels cells and said amplifying portion; wherein
   said first polarizer reflects light of a first polarization toward said first Pockels cell;
   said first Pockels cell is driven by application of voltage sufficient to rotate the polarization of transmitted light by 90 degrees in the time from when said light of a first polarization has passed through until it returns via said first reflective mirror, so as to convert light of said first polarization into light of a second polarization, said applied voltage being maintained for a predetermined period so as to rotate the polarization of transmitted light by 90 degrees; and
   said second Pockels cell is driven by application of voltage when extracting amplified light amplified by making a roundtrip of said amplifying portion from said resonator, so as to convert said amplified light to amplified light of said first polarization;
   the amplified light of said first polarization being reflected by said second polarizer to be extracted outside of said resonator.

2. A regenerative optical amplifier comprising:
   a resonator having first and second reflective mirrors forming ends of a roundtrip path for light, and an amplifying portion for amplifying light in said roundtrip path;
   first and second Pockels cells respectively provided on first and second reflective mirror sides;
   first and second polarizers respectively provided between said first and second Pockels cells and said amplifying portion; and
   a waveplate provided between said first Pockels cell and said first reflective mirror, for rotating the polarization of light by 90 degrees with each roundtrip; wherein
   said first polarizer reflects light of a first polarization toward said first Pockels cell;
   said first Pockels cell is driven by application of voltage sufficient to rotate the polarization of transmitted light by 45 degrees in the time from when said light of a first polarization has been reflected at said first reflective mirror and completed one roundtrip of said first Pockels cell and said waveplate, been converted to light of a second polarization and completed a roundtrip of said amplifying portion side until it returns said first Pockels cell, so as to convert light of said first polarization into light of a second polarization, said applied voltage being maintained for a predetermined period so as to rotate the polarization of transmitted light by 45 degrees; and
   said second Pockels cell is driven by application of voltage when extracting amplified light amplified by making a roundtrip of said amplifying portion from said resonator, so as to convert said amplified light to amplified light of said first polarization;
   the amplified light of said first polarization being reflected by said second polarizer to be extracted outside of said resonator.

3. A regenerative optical amplifier comprising:
   a resonator having first and second reflective mirrors forming ends of a roundtrip path for light, and an amplifying portion for amplifying light in said roundtrip path;
   a first Pockels cell provided on said first reflective mirror side, whose optical axis is tilted in a direction such as to rotate the polarization of light by 45 degrees with each roundtrip;
   a second Pockels cell provided on the second mirror side; and
   first and second polarizers respectively provided between said first and second Pockels cells and said amplifying portion; wherein
   said first polarizer reflects light of a first polarization toward said first Pockels cell;
   said first Pockels cell is driven by application of voltage sufficient to rotate the polarization of transmitted light by 45 degrees in the time from when said light of a first polarization has been reflected at said first reflective mirror and completed one roundtrip of said first Pockels cell and said waveplate, been converted to light of a second polarization and completed a roundtrip of said amplifying portion side until it returns to said first Pockels cell, so as to convert light of said first polarization into light of a second polarization, said applied voltage being maintained for a predetermined period so as to rotate the polarization of transmitted light by 180 degrees; and
   said second Pockels cell is driven by application of voltage when extracting amplified light amplified by making a roundtrip of said amplifying portion from said resonator, so as to convert said amplified light to amplified light of said first polarization;
   the amplified light of said first polarization being reflected by said second polarizer to be extracted outside of said resonator.

4. A regenerative optical amplifier in accordance with claim 1, wherein said second Pockels cell is driven by application of a voltage sufficient to rotate the polarization of transmitted light by 90 degrees in the time from when said amplified light has passed until it returns via said second reflective mirror so as to convert said amplified light into amplified light of said first polarization.

5. A regenerative optical amplifier in accordance with claim 1, wherein said second Pockels cell is driven by application of a voltage sufficient to rotate to polarization of transmitted light by 45 degrees from the time when light which has made a roundtrip of said amplifying portion to become said amplified light has completed a roundtrip until prior to said amplified light passing through so as to convert said amplified light into amplified light of said first polarization.

* * * * *